(No Model.) 4 Sheets—Sheet 1.
J. P. DAVENPORT.
POTATO PLANTER.
No. 591,386. Patented Oct. 12, 1897.
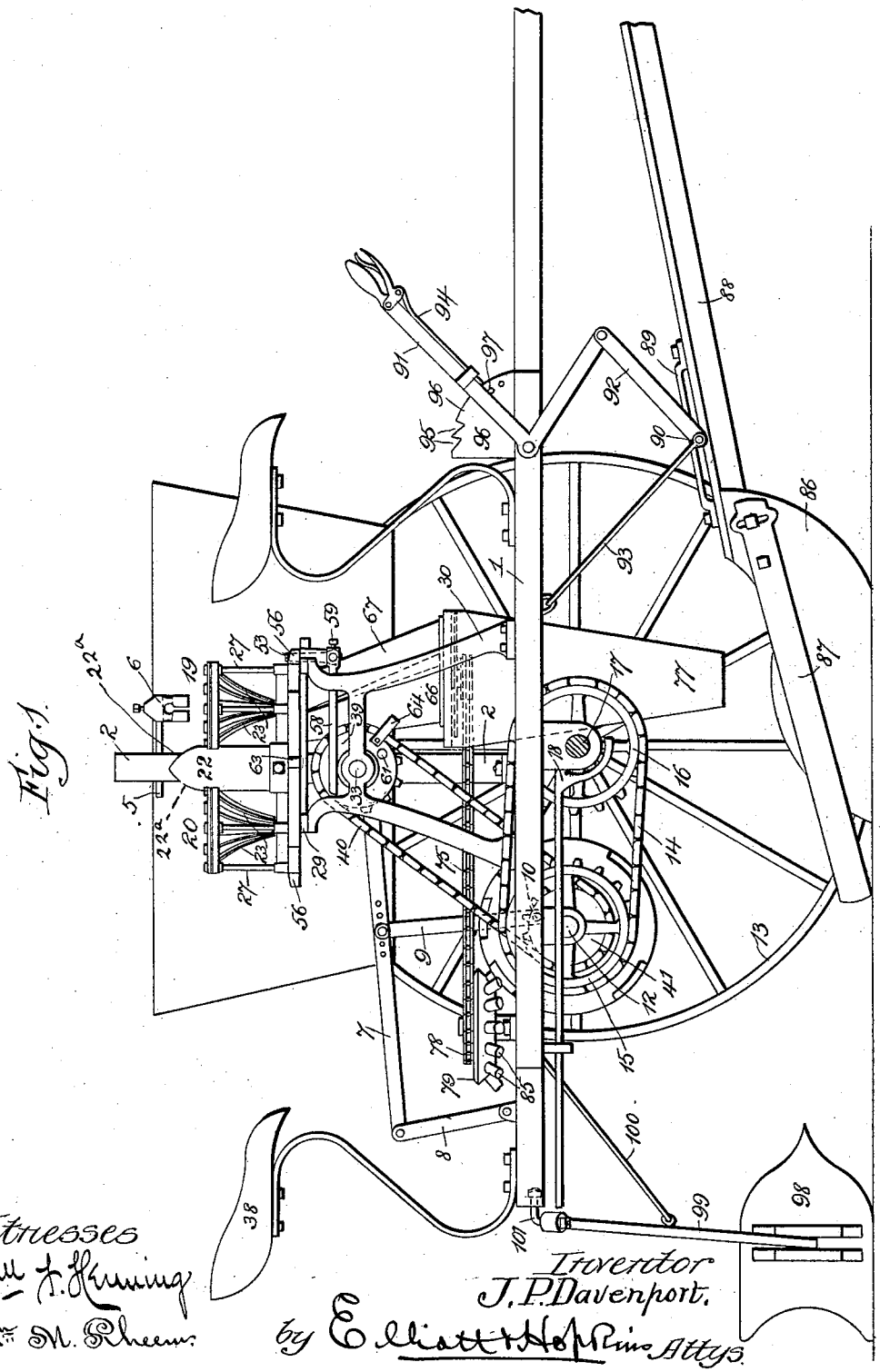
Witnesses
Wm. F. Huning
Wm. N. Rheem
Inventor
J. P. Davenport.
by Elliott & Hopkins Attys.
THE NORRIS PETERS CO., PHOTO-LITHO., WASHINGTON, D. C.

(No Model.) 4 Sheets—Sheet 2.
J. P. DAVENPORT.
POTATO PLANTER.
No. 591,386. Patented Oct. 12, 1897.
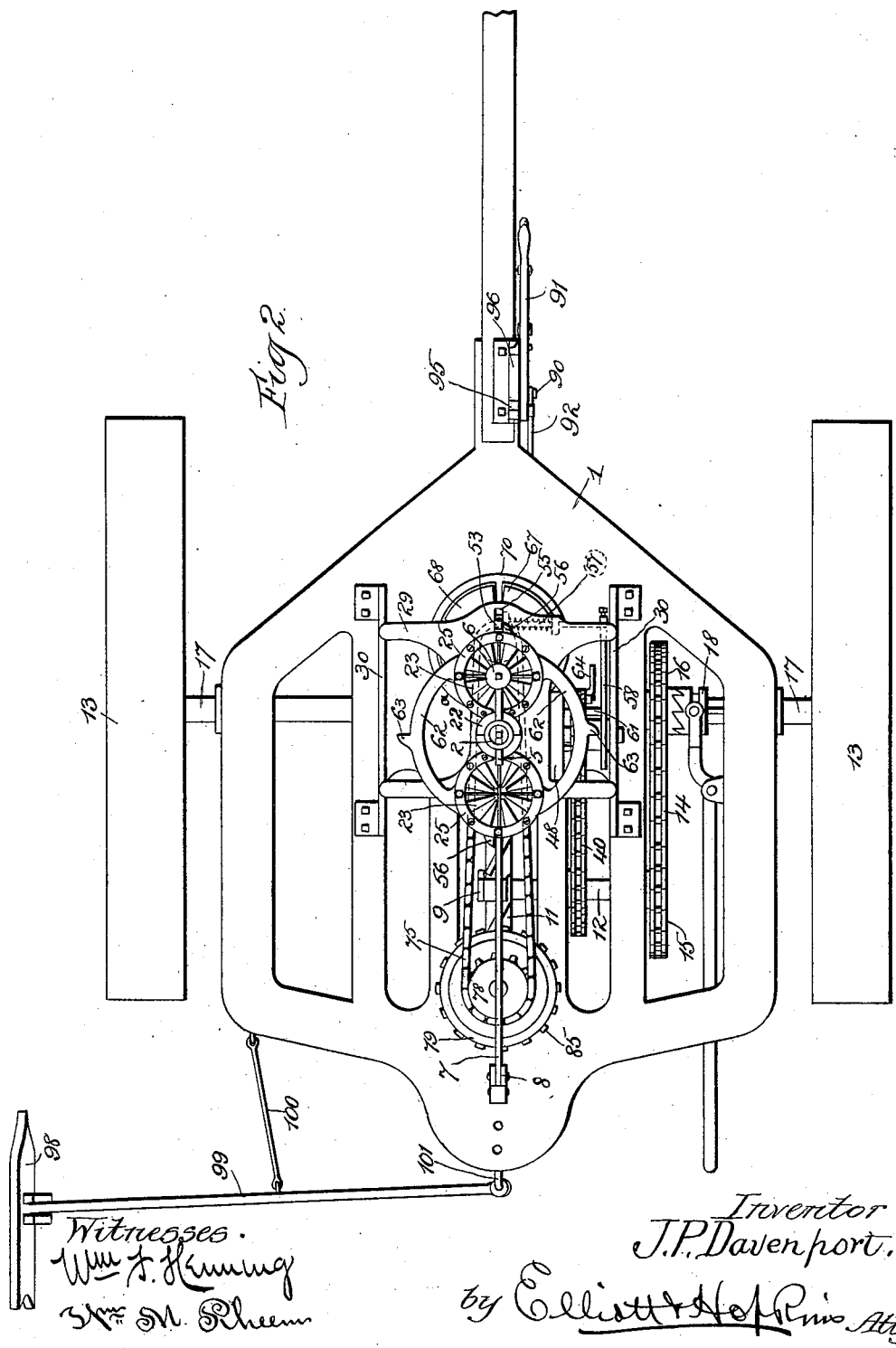

(No Model.) 4 Sheets—Sheet 3.
J. P. DAVENPORT.
POTATO PLANTER.
No. 591,386. Patented Oct. 12, 1897.
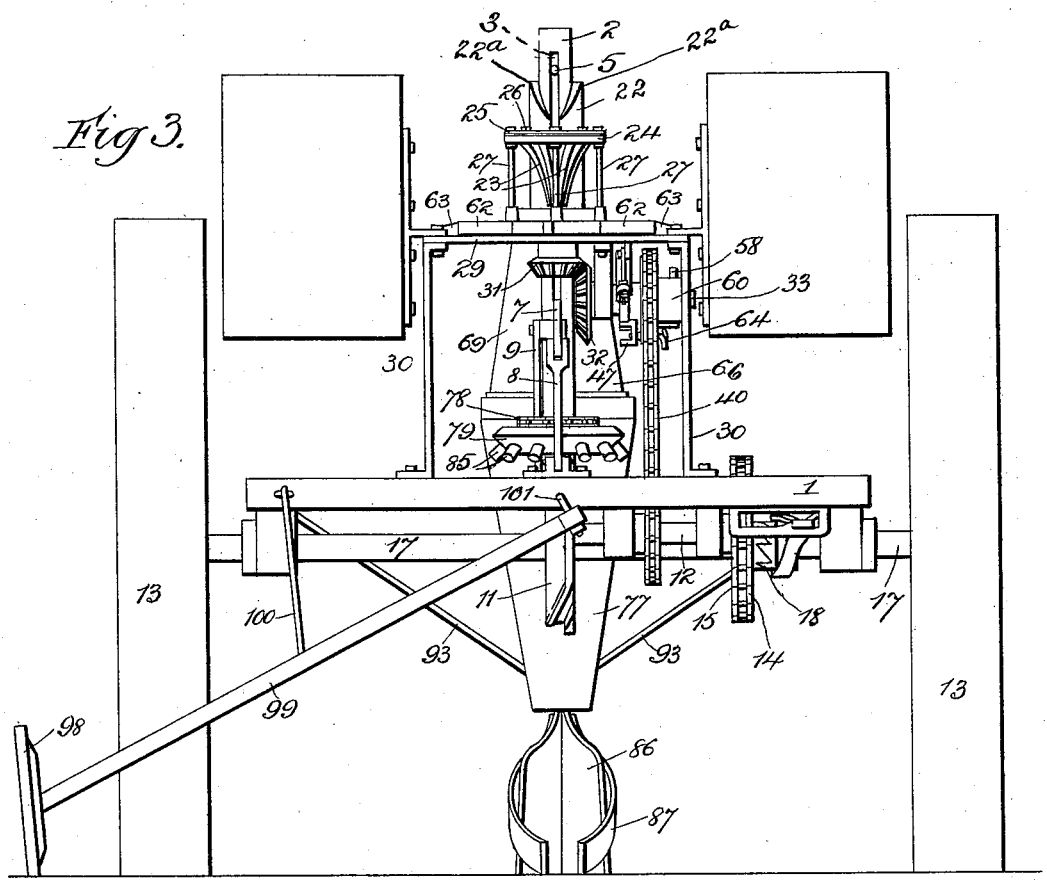

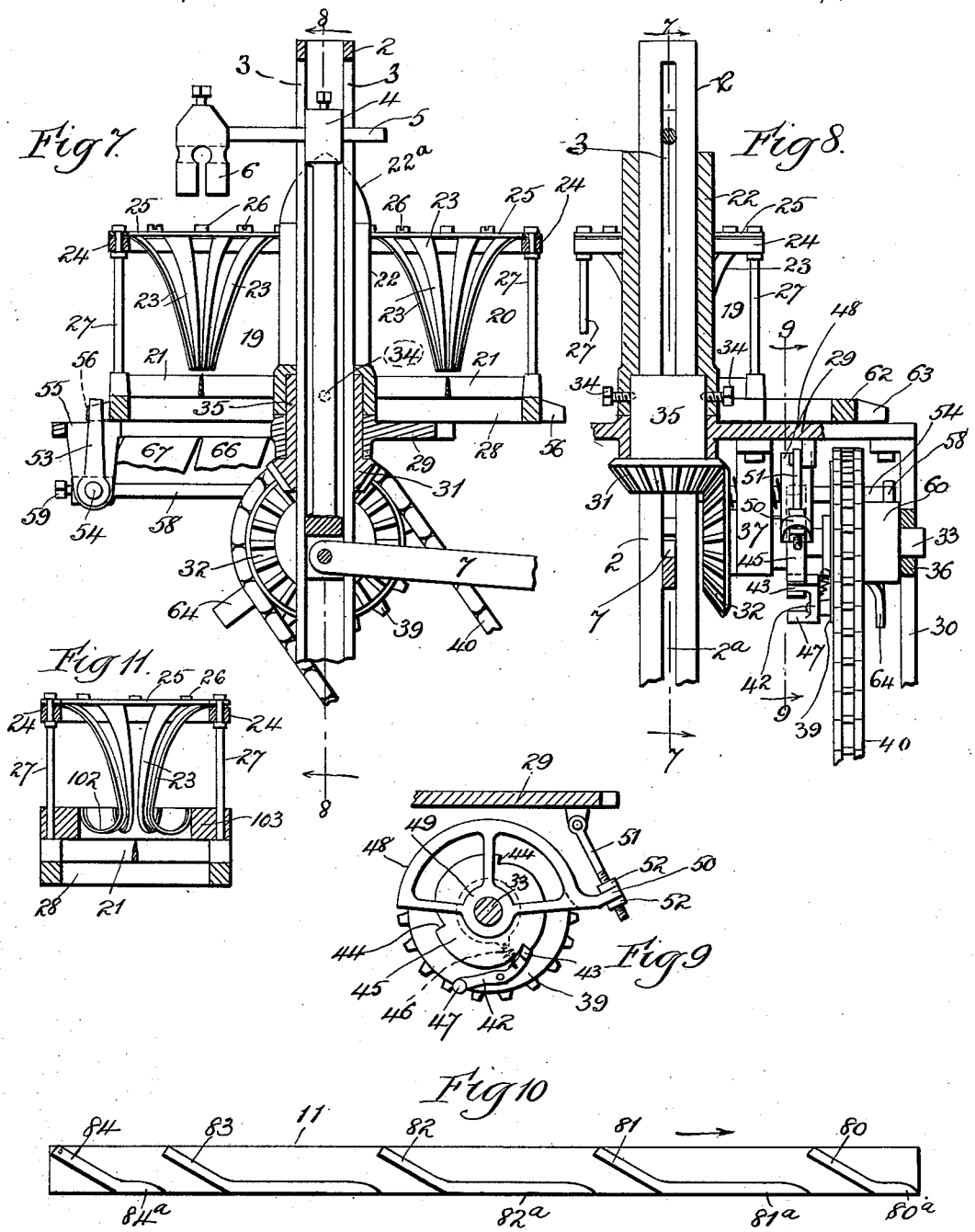

UNITED STATES PATENT OFFICE.

JOSEPH P. DAVENPORT, OF DOWNER'S GROVE, ILLINOIS.

POTATO-PLANTER.

SPECIFICATION forming part of Letters Patent No. 591,386, dated October 12, 1897.

Application filed December 7, 1893. Serial No. 492,974. (No model.)

*To all whom it may concern:*

Be it known that I, JOSEPH P. DAVENPORT, a citizen of the United States, residing at Downer's Grove, in the county of Du Page and State of Illinois, have invented certain new and useful Improvements in Potato-Planters, of which the following is a full, clear, and exact specification.

My invention relates to that class of potato-planters designed to first cut the potato into the requisite number of eyes or pieces for planting and then drop such eyes or pieces at proper intervals into a row or furrow formed by the machine as it proceeds, after which they are covered by means of suitable covering devices; and my present invention is designed more particularly as an improvement on a machine of this nature shown and described in United States Letters Patent No. 498,773, issued to me June 6, 1893.

In my former invention the construction was such that one of the eyes or pieces of potato as it left the cutting mechanism dropped directly through one of the spouts leading from the cutting mechanism into the hill or furrow without being detained by the valve arranged at the lower ends of these spouts for arresting the other portions or eyes. This direct dropping of the eyes I have found objectionable in that the eyes or portions which drop into the furrow directly from the cutting mechanism do not fall at regular intervals, owing to the fact that in some instances the sections of the potato hang for a brief period on the cutting mechanism, and hence permit the machine to advance a greater distance before the eye reaches the ground than it traveled while dropping the preceding eye.

One of the objects of my present invention therefore is to catch and retain all the eyes or pieces of potato and subsequently drop them into the furrow, whereby the dropping of each eye may be accurately gaged and the eyes caused to reach the ground at the proper intervals apart.

Another object of my invention is to cause the hoppers to revolve successively into coincidence with the set of spouts, whereby their operating mechanism may be greatly simplified and all the hoppers may be caused to successively stop at the same place when in position for receiving the potato, and thus enable the feeder to convey the potato always to the same point for depositing it in the hopper and avoid the necessity of feeding first on his right and then on his left, as in my prior invention.

A further object of my invention is to simplify the construction of the hoppers and better adapt their yielding sides for holding potatoes of various sizes while acted upon by the usual rising-and-falling plunger; and my invention has for its object generally to accomplish the same objects sought to be attained in my former invention by a more simple, effective, and economical form of mechanism.

With a view to the attainment of these objects and certain other objects of minor importance hereinafter described my invention consists in certain features of novelty hereinafter fully explained with reference to the accompanying drawings and more particularly pointed out in the claims.

In the said drawings, Figure 1 is a side elevation of my improved machine, one of the potato boxes or receptacles and ground-wheels being omitted. Fig. 2 is a plan view thereof with the seats and potato-boxes omitted. Fig. 3 is a rear elevation with the feeder's seat omitted. Fig. 4 is a detail sectional view, on a larger scale, taken on the line 4 4, Fig. 5. Fig. 5 is a detail plan view of the potato-spouts, showing the dividing-knives and a part of the hopper-frame in section, taken on the line 5 5, Fig. 4. Fig. 6 is a detail sectional view taken on the line 6 6, Fig. 4. Fig. 7 is a detail view of the hoppers and their supporting and operating mechanism, partly in section, on the line 7 7, Fig. 8. Fig. 8 is a view of the same parts, showing them in section at right angles to the plane of section in Fig. 7, taken on the line 8 8, Fig. 7, the central standard or upright and certain other parts being shown in elevation. Fig. 9 is a detail sectional view taken on the line 9 9, Fig. 8. Fig. 10 is a diagrammatic plan illustrating the form and arrangement of the feathers or cams on the periphery of the drum or disk, hereinafter described, for imparting the requisite intermittent rotation to the dropping-valve, the perimeter of the drum being shown as if laid out in the form of a plane; and Fig. 11 is a sectional view of one of the hoppers, illustrating certain modifications hereinafter explained.

Like signs of reference indicate like parts throughout the several views.

In carrying out my invention I provide the main frame 1 of the machine with a hollow upright or standard 2, which is securely fastened thereon in any suitable manner and is provided throughout the greater portion of its height in diametrically opposite sides with a slot 3. Arranged within this hollow standard 2 is a sliding bar or rod 4, to whose upper end is suitably secured an arm 5, which passes through the standard and the slots in both sides thereof and carries at one end the plunger 6, while the lower end of the rod or bar 4 is pivoted to a horizontal lever 7, supported at its outer end upon the frame 1 by means of a suitable pivoted link or standard 8 and having connection by means of rod 9 with a wrist-pin 10, carried by a disk or drum 11, mounted upon shaft 12 and receiving rotary movement from the ground-wheels 13, Fig. 3, through the intermediary of any suitable gearing, such as the chain 14 and the sprocket-wheels 15 16, mounted upon the shaft 12 and main axle 17, respectively, the sprocket 16 being detachably connected with the axle by means of a suitable clutch 18, as usual. By this mechanism it will be seen the rotation of the ground-wheels 13 during the forward movement of the machine will impart to the plunger 6 the desired rising-and-falling movement, the number of beats or strokes of the plunger to each revolution of the ground-wheels depending upon the relative proportions of the sprockets 15 16.

19 20 are the hoppers for the reception of the potato and in which it is held preparatory to being quartered by the cutting mechanism. These hoppers 19 20 are preferably two in number, and they are mounted so as to revolve about the standard 2 and successively come to rest directly under the rising-and-falling plunger 6, which descends upon the potato as it is held in the hopper and forces it down upon a number of knives 21, which may be so arranged as to divide the potato into the desired number of eyes or sections, in practice a pair of such knives intersecting each other directly under the hopper, so as to divide the potato into four sections or eyes, being found sufficient. The hoppers are carried by a sleeve 22, journaled upon the standard 2 and having in both sides an upright slot 3ᵃ, which leads out through the upper end thereof from a point near the base of the sleeve and coincides with the slot in each side of the standard when the hoppers are in the position they assume while the plunger is rising and falling.

Each of the hoppers consists of a number of depending spring-tongues 23, having tapering lower ends arranged in close proximity, so as to catch and hold the smallest potatoes, while at the same time being capable of yielding sufficiently to allow a potato of maximum size to pass through them. The upper ends of these tongues 23 are turned outward at an angle and clamped between two rings 24 25 by means of screws or bolts 26. Each of the rings 24 is secured at its inner side to the sleeve 22 in any suitable manner, it being also provided with an opening (see Figs. 1 and 7) coinciding with the slots 3 in the standard 3ᵃ and in the sleeve 22, so as to permit the plunger-arm to rise and fall without obstruction, the top rings 25 being of course likewise open at the same place. (See Fig. 5.) These rings 24 are supported at their outer sides or edges by means of standards 27, (see Figs. 5 and 11,) preferably three to each of the rings, arranged as shown in Fig. 5. The lower ends of these standards 27 are secured in a casting 28, which may be formed integrally with or suitably secured to the base of the sleeve 22, which latter is supported upon a horizontal casting or table 29, which is itself supported by the side frames 30.

Rotation is imparted to the sleeve 22 and the hoppers carried thereby by means of a pair of beveled gears 31 32, the former being secured to the sleeve 22 and meshing with the latter gear, which is mounted upon a horizontal shaft 33, deriving its motion from the shaft 12 by suitable mechanism, which will be presently described. The gear or pinion 31 is journaled upon the standard 2, and its connection with the sleeve 22 is effected by means of two set-screws or bolts 34, passing through the base of the sleeve and impinging a hub 35, formed on the pinion 31. The shaft 33 may be journaled at one end in a cross-bar 36 of the frame 30 and at its other end in a suitable hanger 37, depending from the table 29.

The rotation of the shaft 33 is intermittent, always in the same direction, so as to carry one of the hoppers with a potato therein directly under the plunger 6 and allow it to remain there until such plunger has descended and again risen to its former position, as shown in Fig. 7, while the other hopper assumes a position directly in front of the feeder, who occupies the seat 38, for the reception of another potato, and after the plunger has made its descent and returned, as described, to continue the revolution of the empty hopper back to the position directly in front of the feeder and carry the one with the second potato therein to a position under the plunger. To effect this intermittent rotation of the hoppers, I connect the shaft 33 to the ground-wheels, preferably through the intermediary of the shaft 12, by means of a clutch whose driven member automatically disengages with the driving member as soon as the hoppers arrive in the positions which they occupy, respectively, while receiving one potato and holding the other in position to be quartered. One member of this clutch, which is the driving member, consists of a sprocket-wheel 39, mounted loosely upon the shaft 33, and being geared to the shaft 12 by means of a chain belt 40, passing around the sprocket-wheel 41, keyed on the latter shaft. The inner face of the sprocket 39 is provided with a dog or pawl 42, pivoted thereto and having at one end a tooth 43, adapted to engage in a number of notches 44, formed in the periphery of a disk 45, keyed to the shaft 33 and constituting the driven member of the clutch. The dog 42 is held normally in engagement with the periphery of the disk 45 by means of a suitable spring 46, secured to the hub of the sprocket 39, and as the sprocket 39 rotates, carrying the tooth of the dog 42 into engagement with one of the teeth or notches 44, the shaft 33, and consequently the sleeve 22, carrying the hoppers, are rotated, but by the time one of the hoppers has reached a position directly under the plunger 6 a tailpiece 47 on the dog 42 will have come into engagement with the under side of a fixed disengaging band 48, supported on the shaft 33 by a suitable spider 49. The effect of this is to disengage the dog 42 with the disk 45 and hold it out of engagement as long as the tailpiece 47 is in contact with the disengaging band 48, and hence this band is coextensive with the degree of rotation of the shaft 33 required to produce a half-revolution of the hopper-frame. With the bevel-gears 30 31 32 in the proportion shown in the drawings it requires a half-revolution of the shaft 33 to produce a half-revolution of the hopper-frame, and hence the notches or teeth 44 in the disk 45 are three in number, arranged equidistant apart, so that the band 48 will hold the dog 42 out of engagement while the plunger descends and again returns to the extremity of its upward movement, and as soon as this movement has been completed the tailpiece 47 will come out from under the band 48 and permit the tooth 43 of the dog to immediately engage with another one of the notches 44 and cause the hopper-frame to complete its revolution—that is, to carry the empty hopper away from the plunger and bring the other one, with the potato therein, into coincidence with the plunger.

In order that the band 48 may be capable of adjustment to correct any inaccuracy in the relative arrangement of the parts, I provide one end thereof with an ear 50, through which passes a set-screw 51, pivoted to the under side of the table 29 and having a jam-nut 52 on either side of the ear 50, whereby the arrangement of the band 48 may be changed with reference to the periphery of the disk 45.

In order that the momentum of the hopper-frame may not carry it beyond a half-revolution, I provide such frame with an automatic latch which will arrest the movement of the frame as soon as it has completed its half-sweep or brought the hopper directly under the plunger. This latch consists of an upright dog 53, arranged on a rocker-shaft 54 and passing through an opening 55, formed in the table 29, so as to be normally in the path of two lugs 56, formed diametrically opposite each other on the edges of the portions 28 of the hopper-frame. The dog 53 may be held normally at its inner or engaging position by means of a spring 57, coiled upon the shaft 54. The dog 53 is thrown out of engagement with the lugs 56 as soon as the plunger has risen out of the hopper and the tooth of the dog 42 is about to come into engagement with another one of the teeth 44 on the disk 45 by an arm or lever 58, secured to one end of the shaft 54 by set-screw 59 and resting upon the hub 60 of the sprocket-wheel 39, so as to be struck and raised by a pin 61, secured to the outer face of the sprocket 39. Hence at every half-revolution of the sprocket 39 the dog 53 will be thrown outward and there held for a short period for permitting the adjacent lug 56 on the hopper-frame to pass, and as the sprocket 39 continues to rotate, letting the arm 58 descend, the dog 53 will resume its normal position in readiness to oppose the lug 56 on the other side of the frame.

In practice I have found that it is desirable in producing the rotation of the hoppers to first overcome their inertia while at rest by a leverage greater than that which is afforded by the disk 45, so that the strain on the dog 42 and the concussion between it and the teeth of the disk 45 will be diminished. In order to accomplish this, I provide the lower portion of the hopper-frame with a pair of arms or projections 62, one on either side, and on each of these arms I form a lug 63, which lugs, when the hopper-frame revolves, travel in a circle whose periphery is adjacent to the vertical plane through which an arm or projection 64 on the sprocket-wheel 39 travels, the circle in which the lugs 63 travel, however, being of less diameter than that described by the lugs 56, so that the lugs 63 will not come in contact with the dog 53. The arm or projection 64 is arranged a little to the front of the pin 61, so that as soon as the pin has released the dog 53 from engagement with the lug 56 such arm 64 will come into engagement with the lug 63 adjacent thereto and produce a slow revolution of the hopper-frame, which movement continues until the dog 42, which is then traveling more rapidly than the disk 45, overtakes and engages with one of the teeth 44 in such disk.

In order that the slots 3 in the standard 2 and the slots 3ᵃ in the upper end of the sleeve 22 may be brought into exact coincidence in the event the hopper-frame should undergo a slight reverse movement caused by coming into sudden contact with the dog 53, the upper end of the sleeve 22 on each side of its diametrically opposite slots 3ᵃ may be beveled downward to such slots, as indicated more clearly in Figs. 1 and 3, so that when struck by the plunger-arm 5 in its downward movement the sleeve will be rotated until the slots coincide. By thus revolving the hoppers always in the same direction and arresting them on the half-revolution it will be seen that I cause both hoppers to come to rest for the reception of the potato always at the same place, directly in front of the feeder, and thus relieve him of the necessity of conveying the potato alternately to different points, as in my prior construction.

Formed in the table 29, directly under the plunger 6, is an opening 65, below which are arranged the upper ends of a number of spouts 66 67 68 69, into which the eyes or sections of potato fall, respectively, as they leave the cutting mechanism, there being but one set of such spouts common to both hoppers, while each hopper is preferably provided with its own set of knives secured to the lower portion of the hopper-frame, as in my former patent; but it would of course be no departure from the spirit of my invention to have one set of knives common to both hoppers arranged in the opening 65. The upper ends of these spouts are grouped together under the circular opening 65, as shown more clearly in Figs. 4 and 5, but their lower ends branch out in the form of a circular series with a gap or space between the first and last, as shown in Fig. 6. Their lower ends are suitably secured or joined to a casting 70 provided with openings corresponding to the spouts, and below this casting 70 is arranged a circular valve 71, which is of such form as to close all of the spouts at one time, but is provided in one side with a notch or opening 72, as shown in dotted lines in Fig. 6, adapted to coincide successively with the spouts as the valve rotates, and thus after having first arrested and retained for an instant all of the eyes or sections of the potato permitting such eyes to successively drop into the hills at regular and predetermined intervals. By thus detaining all of the eyes and subsequently dropping them I avoid the irregularity in dropping which is apt to occur when any one or more of the eyes is permitted to fall from the cutting mechanism directly into the hills.

The valve 71 may be supported under the casting 70 by a short shaft or bolt 73 passing therethrough and being provided with a sprocket-wheel 74, by which intermittent rotary movement is imparted to the valve through the intermediary of a chain 75 passing through openings 76 in the funnel 77 and extending around a sprocket 78, secured to the upper side of what might be termed a "worm-wheel" 79, which derives an intermittent rotation from a number of cams or feathers 80 81 82 83 84, formed on the perimeter of the drum or disk 11.

The teeth of the worm-wheel 79 are composed of a number of short rollers 85, pivoted to the under beveled edge of the wheel and being arranged at just sufficient distance apart to permit the feathers on the drum 11 to pass between them. The office of these cams or feathers on the drum 11 is to move the opening 72 in the valve 71 successively under the spouts, and they are arranged at such distance apart that the machine may proceed along the row or furrow the distance between the hills after one spout is opened before the next is opened. This, it will be understood, is effected by the oblique portions of the cams or feathers coming into engagement with the rollers on the wheel 79, the opening in the valve remaining under each of the spouts, excepting the last one, 69, until the next hill is reached and then suddenly passing from the spout which last discharged to the next spout. It is evident, however, that should the opening in the valve remain under the last spout 69 until the next hill is reached such hill would be skipped and no potato dropped therein, because the next movement of the valve brings the opening therein under the blank space, from which no potato drops, and therefore the feather 84 is so arranged that after the feather 83 has opened the spout 69 the former will immediately move the opening under the blank space, and the feather 80 will then move it under the first spout 66 of the series, the sum of the distances between the feathers 83 84 and 84 and 80 being equal to the distance between the feathers 81 82 or those adjacent to them, so that the machine will travel from one hill to another while the opening in the valve is passing from the spout 69 to the spout 66. A further reason for closing the spout 69 immediately after it is opened is to prevent the next eye of the potato which falls into that spout from dropping directly through into the hill.

Assuming that the valve is in the position illustrated in Fig. 6 and each of the spouts contains an eye, the further forward movement of the machine will bring the feather 80 almost immediately into engagement with the worm-wheel 79, and thus instantly throw the opening in the valve under the first spout 66. The drum 11 then rotates without further effect on the wheel 79, the straight or inactive portion 81$^a$ of the feather 81 being then passing between the rollers of the wheel 79, allowing the valve-opening to remain under the spout 66 until the next hill is reached. The devious portion of the feather 81 then shifts the opening of the valve to the next spout 67, after which the wheel 79 is engaged by the next straight portion 82$^a$ of the feather 82, which holds the wheel inactive, and so on until the feather 83 has brought the opening in the valve under the last spout 69; but almost immediately after the devious portion of the feather 81 has passed by the rollers 85 the rollers are again engaged by the end of the feather 84, its forward end being turned into line with the straight portions of the preceding feathers simply for the purpose of insuring a more easy engagement between the rollers of the worm-wheel, and, as before said, almost immediately after the feather 84 has closed the spout 69 and brought the opening in the valve under the blank space, where it remains for an instant to allow the sections of potato to reach and lodge on the valve, the next feather or cam 80 throws the valve-opening under the first spout 66 again. Thus while the period which exists between the closing of the spout 68 and the spout 69 is of shorter duration than that which exists between the closing of any two of the preceding spouts the time which elapses between the opening of the spout 68 and the opening of the spout 69 nevertheless is the same as that which elapses between the opening of the spout 69 and the opening of the spout 66 or between the opening of the spout 66 and the next or any of the intermediate ones, and hence the potatoes are dropped at equidistance apart, notwithstanding the blank space between the first and last spouts of the series.

The furrow-opener 86 and the covering-irons 87 are carried, as usual, by a pivoted beam 88, provided with a casting 89, forming a longitudinal slot. In this slot I arrange a sliding stud 90, as in my former device, but in my present invention I connect this stud with the bell-crank lifting-lever 91 by means of a separate link 92, and I also connect this stud 90 to the frame of the machine by two pivoted rods 93, depending from the under side of the frame and diverging to opposite sides of the latter, so as to prevent side flection of the beam 88, another office of the rods 93 being to coöperate with the lever 91 in raising the stud 90, so as to elevate the beam, as will be readily understood. After the beam has been elevated it may be locked in position by the dog 94 on the lever 91 engaging in one of the notches 95, formed in the segment 96, as in my prior invention; but the lower edge of the segment 96 in my present invention is plain, as shown, so that in the event any of the parts carried by the beam 88 should strike an obstruction, causing such beam to rise and force the lever 91 upward, the dog 94 will not come into engagement with any of the teeth 95, and consequently as soon as the obstruction has been passed the beam will descend to the position at which it was formerly set, such position being determined by a stop-pin 97, inserted in any one of a series of holes in the segment 96. By this arrangement the necessity of resetting the covering-irons and opener 86 each time they encounter an obstruction is avoided.

In order that the marker 98 may be readily thrown from side to side and danger of damage to its stem 99 may be avoided in the event its hook 100 becomes detached from the frame of the machine, I employ an L-shaped connection or coupling 101 between the stem 99 and the frame. The horizontal portion of this connection or coupling 101 is journaled in the frame of the machine, while its depending portion is passed through an eye in the end of the stem. Thus in throwing the marker from side to side it may be carried over in a vertical plane rotating upon the horizontal portion of the coupling 101, or in a more or less oblique plane rotating it upon both the portions of the coupling 101, according to the position in which the operator happens to be standing. In other words, it is not necessary to hold the stem of the marker in any particular position when shifting it from side to side. In the event the hook 100 should become detached, allowing the marker to lag behind, the latter will rotate on the depending portion of the coupling 101 until it straightens out into the line of movement of the planter, and thus avoid any damage to the stem or coupling.

With the form of hopper heretofore in use it is found that when a potato of less size than the plunger is deposited therein the plunger permits it to escape as soon as the plunger descends into engagement with the spring-actuated sections and throws them upward and away from the potato often before the potato is reached by the plunger and forced down against the stationary knives. In order to avoid this objection and compel the ends of the spring-tongues to remain in contact with the potato, even though the tongues should be slightly crowded outward by the plunger at a point above the potato, I provide the lower ends of such tongues with upwardly and downwardly bent portions 102, as shown in Fig. 11, which abut against an annular flange or ring 103, formed on the hopper-frame.

Having thus described my invention, what I claim as new therein, and desire to secure by Letters Patent, is—

1. In a potato-planter, the combination of a number of hoppers, cutting mechanism, a set of spouts common to all of said hoppers for receiving the pieces of potato therefrom, and means for imparting an intermittent rotary movement to said hoppers, in the same direction of rotation substantially as set forth.

2. In a potato-planter, the combination with a number of hoppers and cutting mechanism, of a set of spouts common to all of said hoppers, a revoluble frame upon which said hoppers are mounted, having lugs, a latch arranged to engage said lugs and means for disengaging said latch and giving said frame partial revolutions always in the same direction, substantially as set forth.

3. In a potato-planter, the combination of a number of revoluble hoppers, and cutting mechanism, of a set of spouts arranged under said hoppers, ground-wheels, a clutch having one member geared to said ground-wheels and the other geared with said hoppers for revolving them over said spouts, and means for automatically disengaging said clutch members when the hoppers coincide with the spouts, substantially as set forth.

4. In a potato-planter, the combination with a hollow standard having a longitudinal slot therein, a slotted sleeve journaled on said standard, a sliding bar arranged within said standard, and having an arm projecting through said slot in the standard, a plunger carried by said arm, means for raising said plunger-arm above said sleeve, a number of hoppers carried by said sleeve and means for imparting intermittent rotation to said sleeve, substantially as set forth.

5. In a potato-planter, the combination of a rising-and-falling plunger having an arm, a revoluble frame carrying a number of hoppers and having a slotted sleeve into the slot of which said arm descends, said sleeve being beveled or inclined on the sides of said slot, and means for raising said arm above said sleeve and revolving said frame, substantially as set forth.

6. In a potato-planter, the combination of a revoluble hopper-frame, cutting mechanism, means for imparting a partial revolution to said frame and an intermittently-engaging latch for arresting the movement of said frame, substantially as set forth.

7. In a potato-planter, the combination of revoluble hoppers, cutting mechanism, a clutch having connection with said hoppers for revolving them, means for disengaging the members of said clutch, a latch for arresting the movement of said hoppers and means for disengaging said latch before said clutch members come into engagement, substantially as set forth.

8. In a potato-planter, the combination of cutting mechanism, a hopper-frame carrying hoppers and being provided with lugs, a latch normally in the path of said lugs, and means for disengaging said latch and intermittently imparting a partial revolution to said frame, substantially as set forth.

9. In a potato-planter, the combination of cutting mechanism, a revoluble hopper-frame carrying hoppers, a shaft geared to said frame for revolving it, means for intermittently revolving said shaft, a latch for locking said frame, and a continuously-moving lug for periodically disengaging said latch, substantially as set forth.

10. In a potato-planter, the combination of cutting mechanism, a revoluble frame carrying hoppers, a shaft geared to said frame for revolving it, a clutch mounted upon said shaft and having one member secured thereto and the other member loose thereon, the ground-wheels geared with the loose member of said clutch, and means for automatically disengaging said clutch members, substantially as set forth.

11. In a potato-planter, the combination of knives for cutting the potato, a rising-and-falling plunger for coöperating with said knives, a revoluble frame carrying the hoppers, a shaft geared to said frame for revolving it, a clutch for revolving said shaft having means for causing its members to automatically engage, and means for holding said clutch members out of engagement during the rising-and-falling movement of said plunger, substantially as set forth.

12. In a potato-planter, the combination of a hopper-frame, a shaft geared to said frame for revolving it, a notched disk secured to said shaft, a sprocket-wheel loose on said shaft, a pivoted dog carried by said wheel and normally engaging with said disk, a band arranged in the path of said dog and adapted to hold the same out of engagement, and means for driving such sprocket-wheel, substantially as set forth.

13. In a potato-planter, the combination of a hopper-frame, means for revolving said frame intermittently, and means for imparting an initial movement to said frame in advance of its said intermittent revolution, substantially as set forth.

14. In a potato-planter, the combination with a number of spouts for holding the eyes or sections of the potato, of means for opening said spouts successively and closing them at unequal periods of time, said means being also adapted to close all of said spouts at once, substantially as set forth.

15. In a potato-planter, the combination of a number of spouts for receiving the eyes or sections of the potato, arranged in a series with a space between the first and last, a valve for closing all of said spouts at once, having a gap or opening, and means for imparting to said valve, partial rotations at unequal periods of time, substantially as set forth.

16. In a potato-planter, the combination of a set of spouts for receiving the eyes or pieces of potato, a valve for closing all of said spouts at once, having a gap or opening therein, a worm-wheel connected with said valve for rotating it, a drum or wheel having feathers or cams thereon engaging with said worm-wheel for imparting an intermittent rotation thereto, and means for revolving said drum, substantially as set forth.

17. In a potato-planter, the combination of a set of spouts for receiving the pieces or eyes of potatoes, having a gap or opening therein, a worm-wheel connected with said feathers or cams thereon for engaging with said worm-wheel and being arranged at unequal distances apart for imparting partial revolutions to said valve at unequal periods, substantially as set forth.

18. In a potato-planter, the combination of the frame, a pivoted beam for carrying the furrow-opener, a stud having slotted connections with said beam, pivoted rods connecting said stud with said frame, a lever, a link connecting said lever with said stud, and means for locking said lever, substantially as set forth.

19. In a potato-planter, the combination with a plunger, of a hopper having a number of spring-tongues provided with outwardly-turned portions, and a ring surrounding said outwardly-turned portions and forming an abutment therefor, said outturned portions bearing normally against said ring, substantially as set forth.

J. P. DAVENPORT.

Witnesses:
F. A. HOPKINS,
EDNA B. JOHNSON.